Figures 1, 2, 3:
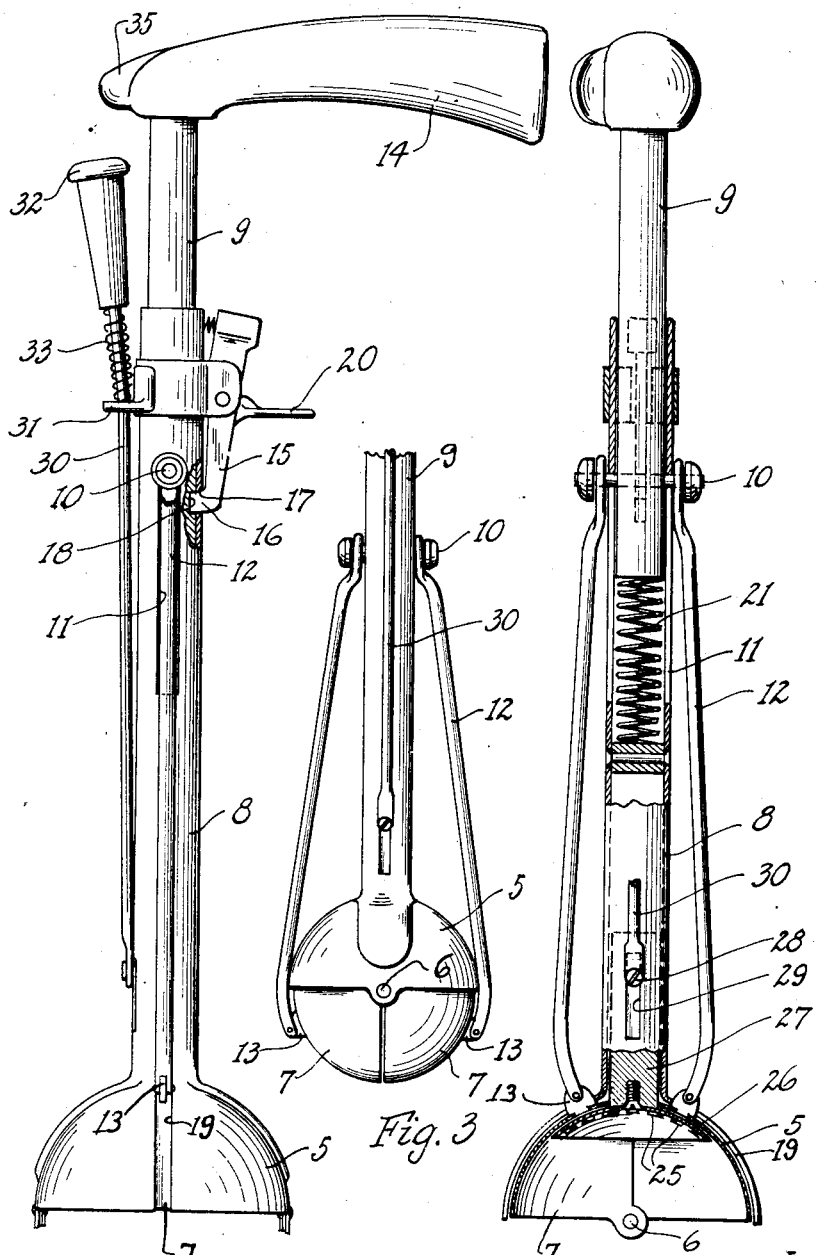

June 25, 1929.  C. J. HALSET ET AL  1,718,555
ICE CREAM FORMER
Filed Sept. 30, 1927

INVENTORS:
Christ J. Halset
John W. Hose
By E. J. Andrews
Att'y.

Patented June 25, 1929.

1,718,555

UNITED STATES PATENT OFFICE.

CHRIST J. HALSET AND JOHN W. HOSE, OF CHICAGO, ILLINOIS.

ICE-CREAM FORMER.

Application filed September 30, 1927. Serial No. 222,961.

This invention relates to ice-cream formers and it has for its object providing means for conveniently and quickly forming or molding ice-cream into spheres or such other shapes as may be desired. The invention has for a further object providing means for making uniform in size the ice cream formed for use on ice-cream cones or for other purposes. A further object is to provide convenient means for stamping a trade-mark or other symbol on the ice-cream which is to be served to customers. Other objects of the invention will be apparent from a consideration of the accompanying drawings and the following description thereof.

Of the drawings, Fig. 1 is an elevation of our ice-cream former which embodies the features of our invention; Fig. 2 is an elevation of the same, partly in section, rotated through an angle of 90 degrees relative to Fig. 1; and Fig. 3 is a fragmental elevation showing the former with its lips closed.

Although the ice-cream former which we illustrate is adapted to forming spheres of ice-cream, it is to be understood that the shapes to be produced are not limited to spheres. The former, as illustrated, comprises a shell 5 which is, in this instance, hemispherical and is substantially the shape of one-half of the ice-cream to be formed. Pivoted to the shell at points 6 are lips 7 which, when closed, are adapted to form with the shell 5 a complete hollow casing, the hollow portion of which is the shape of the ice-cream to be formed.

In use, the operation of the device consists in pressing the shell, with the lips entirely open, into the ice-cream, giving it a rocking and twisting motion, if desired, until the shell is filled with ice-cream, and then, by suitable mechanism, continuous pressure of the shell against the ice-cream will cause the lips to close and to enclose a complete sphere of ice-cream. The mechanism which we employ for this purpose comprises the following:

A tubular shank 8 is rigidly fixed to the shell 5, and a rod 9 is slidably mounted in the shank. Fixed to the rod is a pin 10 which projects outwardly on each side through a slot 11 in the walls of the shank 8. Pivoted to the rod 9 by means of the pin 10 on each side of the shank is one end of link 12. The other end of each of the links 12 is pivoted to one of the lips 7 by means of a lug 13. The lugs project through slots 19. A handle 14 is fixed to the rod 9 and relative movement of the rod 9 and the shank 8 is temporarily prevented by means of a latch 15 which is pivotally connected to the shank and which has a finger 16 which normally projects through an opening 17 in the wall of the shank and into a recess 18 in the rod 9.

In operation, the device is gripped by the handle 14; the shell 5 is pressed into the ice-cream until the shell is full, the device being rotated or rocked more or less as necessary. The operator then, by pulling upwardly on the trigger 20, releases the finger 16 from the recess 18, thus allowing the rod 9 to be moved inwardly relative to the shank. Further pressure on the handle will then produce relative movement of the rod and shank and, by means of the connecting links 12, the lips 7 will be turned inwardly, enclosing the proper amount of ice-cream to complete the sphere. Inasmuch as this closing of the lips is produced entirely by the relative movement of the rod and shank, it is obvious that no further inward movement of the shell 5 is required after it becomes full.

Having filled the former, the operator holds the lips closed by maintaining his finger on the trigger 20 until the sphere is removed from the ice-cream. The ice-cream sphere is then deposited on the ice-cream cone or dish where desired. The trigger is then released and a spring 21 forces the rod 9 outwardly and this opens the lips 7 by means of the links 12.

In order to stamp a trade name or other words or symbols on the ice-cream sphere, we provide reverse letters 25, or other characters, within the shell 5. These letters may be positioned in the shell in any suitable manner, but we prefer to position them on a sheet 6, which is curved to correspond to the curve of the shell 5, and mount this sheet movably in the shell. In this instance, we prefer to fix the sheet 26 to a shank 27 which is slidably mounted in the tubular shank 8. By means of a pin 28, passing through a slot 29 in the shell, a rod 30 is pivoted to the shank 27. The other end of the rod 30 extends along the shank 8 and is slidably associated therewith by means of a lug 31 through an opening of which the rod passes.

In forming the ice-cream sphere, preferably when the lips have been closed, pressure on a button 32 fixed to the end of the rod 30 forces the letters 25 into the ice-cream and insures a clear impression thereof, which might not be so satisfactorily produced if the letters were fixed to the inner surface of the shell 5. The plate 26 may also be used to force the sphere from the shell after the lips are opened. If the conditions are right, the forcing of the sphere from the shell is accomplished at the same time as the letters are more completely impressed on the shell, a single operation accomplishing both purposes.

In operation, the button 32 is usually forced upwardly relative to the handle 14, somewhat beyond the handle, and the operator preferably operates the stamp plate 26 by placing his thumb on the button 32. The relative location of the handle 14 and the trigger 20 and the button 32 are such that, in operation, the various steps may be very conveniently carried out. When the button 32 is released, a spring 33 forces the rod 30 upwardly and brings the plate 26 snugly against the inner surface of the shell 5.

A flange 35 is fixed to the handle 14 to assist the operator in holding the handle securely in his hand.

Although we have illustrated our invention by referring to its use in forming ice-cream, yet we do not wish to limit our invention to such use, as it is applicable to any plastic material which is to be formed into small uniform masses. And obviously, variations could be made in the details of the device by those skilled in the art, without departing from the spirit of our invention as set forth in the following claims.

We claim as our invention:

1. A device for forming masses of plastic material comprising a shell, lips pivoted to the shell and adapted to close and form with the shell a complete hollow casing, a hollow shank projecting from said shell, a rod slidably mounted in said shank, locking means for preventing relative sliding movement of said rod and shank, means pivotally connecting said rod with each of said lips, and means for unlocking said locking means.

2. A device as claimed in claim 1, and resilient means tending to force said rod and shank to their normal locked positions.

3. A device as claimed in claim 1, in which an operating handle projects angularly from the outer end of said rod.

4. A device for forming masses of plastic material comprising a shell, lips pivoted to the shell for forming when closed a hollow casing, means for closing said lips, an operating handle fixed to said closing means, said means being movable relative to said shell, means for locking said closing means against movement relative to said shell, releasing means for unlocking said locking means, said releasing means being positioned between said handle and said shell.

In testimony whereof we hereunto set our hands.

CHRIST J. HALSET.
JOHN W. HOSE.